(12) United States Patent
Horling et al.

(10) Patent No.: US 8,602,197 B2
(45) Date of Patent: Dec. 10, 2013

(54) SUPPORT ROLLER ASSEMBLY

(75) Inventors: Peter Horling, Schonungen-Mainberg (DE); Sandra Kamm, Gochsheim (DE); Edgar Pickel, Sommerach (DE)

(73) Assignee: Aktiebolaget SKF, Göteborg (SE)

( * ) Notice: Subject to any disclaimer, the term of this patent is extended or adjusted under 35 U.S.C. 154(b) by 624 days.

(21) Appl. No.: 12/757,558

(22) Filed: Apr. 9, 2010

(65) Prior Publication Data

US 2011/0247922 A1    Oct. 13, 2011

(51) Int. Cl.
    *B65G 13/00*    (2006.01)
(52) U.S. Cl.
    USPC .......................................................... 193/37
(58) Field of Classification Search
    USPC ........... 193/37, 35 R; 198/835; 384/581, 582, 384/535, 536
    See application file for complete search history.

(56) References Cited

U.S. PATENT DOCUMENTS

| | | | | |
|---|---|---|---|---|
| 1,693,533 A | * | 11/1928 | Stickney | 400/661.4 |
| 2,825,439 A | * | 3/1958 | Collis | 193/35 R |
| 3,057,450 A | * | 10/1962 | Gallagher, Jr. | 400/659 |
| 3,385,543 A | * | 5/1968 | Jakel et al. | 384/582 |
| 4,029,200 A | * | 6/1977 | Dillon | 198/830 |
| 4,247,213 A | * | 1/1981 | Wurscher | 400/661 |
| 4,311,226 A | * | 1/1982 | Thompson et al. | 193/35 R |
| 4,852,230 A | * | 8/1989 | Yu | 29/898.07 |
| 4,955,462 A | * | 9/1990 | Bilodeau et al. | 193/37 |
| 5,437,209 A | * | 8/1995 | Santoro | 74/559 |
| 5,655,642 A | * | 8/1997 | Lawrence et al. | 193/37 |
| 5,816,724 A | * | 10/1998 | Hada et al. | 400/656 |
| 6,702,091 B2 | * | 3/2004 | Nimmo et al. | 193/37 |
| 2006/0180426 A1 | * | 8/2006 | Scott | 193/37 |

FOREIGN PATENT DOCUMENTS

| | | | |
|---|---|---|---|
| DE | 1738837 U | | 1/1957 |
| DE | 2605268 A1 | | 8/1977 |
| DE | 3205061 A1 | | 8/1983 |
| DE | 3345368 A1 | * | 6/1985 |
| DE | 102007049442 A1 | | 4/2009 |
| JP | 59143812 A | * | 8/1984 |

* cited by examiner

*Primary Examiner* — Gene Crawford
*Assistant Examiner* — Keith R Campbell
(74) *Attorney, Agent, or Firm* — Bryan Peckjian; SKF USA Inc. Patent Department

(57) ABSTRACT

A support roller assembly comprises a support roller formed at least in part as a hollow cylinder. At least two bearings are spaced from each other in the axial direction of the support roller and rotatably support the support roller. At least one cushioning element is disposed within the support roller in the axial spacing between the two bearings. The cushioning element includes at least one ring made of cushioning material that extends adjacent the inner surface of the support roller.

20 Claims, 2 Drawing Sheets

SUPPORT ROLLER ASSEMBLY

TECHNICAL FIELD

The invention generally relates to a support roller assembly, which may include a support roller having a hollow cylinder shape at least in part and being supported by two bearings spaced apart in the axial direction of the support roller.

DESCRIPTION OF THE KNOWN ART

Support rollers are utilized, e.g., to support a belt in conveying devices in a variety of fields. Several design possibilities are known for rotatably bearing the support roller, including specialized designs that provide a layer of cushioning material between the support roller and the bearing, e.g., a roller bearing, for the purpose of improved cushioning and reduced vibrations during operation.

For example, DE 1 738 837 U discloses a bearing assembly for a support roller that includes a cushioning layer made of rubber or plastic material disposed between the support roller and a shaft. However, such a design is disadvantageous because vibrations and noise are known to increasingly occur in embodiments of longer support rollers (e.g., more than 1 meter) due to the rotor dynamics, which impairs the operation of the support roller.

SUMMARY

In one aspect of the present teachings, a support roller assembly is disclosed that can be operated relatively quietly, even for relatively long support rollers.

In another aspect of the present teachings, a support roller having a hollow cylinder shape at least in part is supported by at least two bearings that are spaced apart in the axial direction of the support roller. At least one cushioning element is preferably disposed within the hollow support roller in the axial space between the two spaced-apart bearings. The at least one cushioning element preferably includes at least one ring with a circumferentially-extending portion disposed adjacent to the inner surface of the support roller. The ring is preferably made of a cushioning material, such as an elastomer and/or rubber material. The ring may preferably extend continuously around the inner circumferential surface of the support roller, i.e. in an unbroken-manner.

More preferably, the ring may comprise or be made of nitrile butadiene rubber (NBR) having a Shore hardness of at least 40.

An outer sleeve is preferably disposed between the ring and the inner circumferential surface of the support roller. The outer sleeve can be comprised of a plurality of segments that are discontinuous in the circumferential direction. Further, the outer sleeve can include a radially-inward extending ring segment at least one of its axial ends. Preferably, such a radially-inward extending ring segment is provided only at one of its axial ends.

An inner sleeve can be disposed in, at or adjacent a radially-inner portion or surface of the ring. Likewise, the inner sleeve can be comprised of a plurality of segments that are discontinuous in the circumferential direction. The inner sleeve can include a radially-outward extending ring segment at least at one of its axial ends. Preferably the inner sleeve also has such a radially-outward extending ring segment only at one of its axial ends.

In another aspect of the present teachings, the radially-inward extending ring segment and the radially-outward extending ring segment are disposed at or on opposite axial ends (sides) of the ring. Preferably, the two ring segments serve to fix the location of the ring in the axial direction of the support roller.

In case the inner sleeve and/or the outer sleeve is/are segmented or discontinuous in the circumferential direction, the break points between the respective segments of the outer sleeve and the break points between the respective segments of the inner sleeve are preferably offset relative to each other in the circumferential direction. In this case, the break points of the outer sleeve are preferably disposed, as viewed along the circumferential direction, substantially or nearly in the middle of the circumferential extension of the respective segments of the inner sleeve.

The material of the ring may be connected or bonded with the outer sleeve and/or with the inner sleeve preferably using a vulcanization or injection molding process.

The outer and inner sleeves are preferably comprised of metal, e.g., a metal plate and more preferably a steel metal plate. However, one or both of the sleeves may be manufactured from plastic, in particular the outer sleeve.

Roller bearings are preferred for bearing the support roller.

The support roller is preferably formed as a pipe having a constant wall thickness and is preferably borne by a bearing at each axial end.

In one or more of the aspects of the present teachings, a relatively good cushioning of vibrations can be achieved due to the roller dynamics, even for longer embodiments of the support roller, so that a quiet operation is realized as a whole.

Support roller assemblies according to the present teachings may be utilized, e.g., in open-pit mining for conveying materials on a moving belt supported by the support roller assemblies. In such embodiments, high-quality and relatively light bearing assemblies can be provided that exhibit a long service life and a comfortable operation.

In the above-mentioned cases, a weight reduction of the bearing assembly can be achieved in certain aspects of the present teachings, e.g., a relatively light-constructed assembly can be realized.

Further advantages, objects and features of the present teachings will be readily derivable by a skilled person from the following detailed description of the figures and from the appended claims.

DETAILED DESCRIPTION OF THE PREFERRED EMBODIMENTS

Each of the additional features and teachings disclosed below may be utilized separately or in conjunction with other features and teachings to provide improved support roller assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
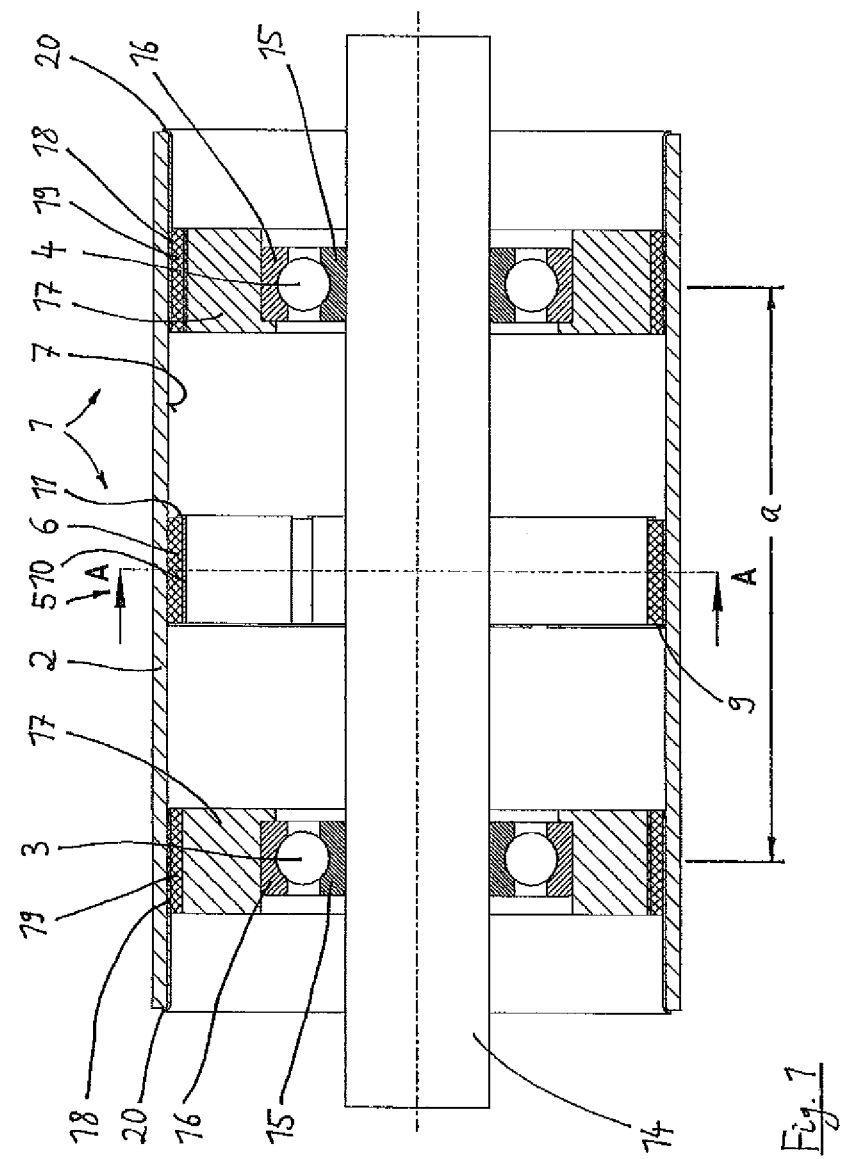
FIG. 1 shows a cross-section through a representative support roller assembly.

FIG. 1 shows a support roller 1 that comprises a support roller 2, which may be utilized to bear or support a conveying element (e.g., a belt) of a conveying apparatus (e.g., a conveyor belt). A shaft 14 may be disposed so as to be stationary, i.e. non-rotating during operation. Bearings 3, 4 may be formed as grooved ball bearings. Inner rings 15 of the bearings 3, 4, respectively, accommodate the shaft 14 therein.

The outer rings 16 of the respective bearings 3, 4 support a support body 17 that has a rim or radially-inward projection on one side. The rim contacts one axial side of the outer ring 16, thereby serving as an axial enclosure or stop for the outer ring 16.

The support roller 2 is formed as a hollow-cylinder part, i.e. as a pipe, at least along a portion of the support roller 2. Naturally, other shapes for the support roller 2 are possible depending upon the conveying element utilized in the particular design. For example, the support roller 2 may include projections, hooks or other types of engaging devices for forcibly moving a conveying element supported by the support roller 2.

As indicated above, a bearing 3, 4 is disposed at each axial end portion of the shaft 14 and support roller 2. The two bearings 3, 4 are spaced relative to each other in the axial direction by a distance a. A sleeve-shaped body or journal 18 is pressed against the inwardly-directed circumferential surface of the support roller 2 and is thus press-fit in the support roller 2. A cushioning layer 19, e.g., made of elastomer or rubber material, is disposed between the sleeve-shaped body 18 and the support body 17. The cushioning layer 19 is in the shape of a hollow-cylinder in the present embodiment. The elastomer and/or rubber material optionally may be directly connected or bonded with the sleeve-shaped body 18 and/or with the support body 17 during an injection molding process or by a vulcanization process.

Preferably, the sleeve-shaped body 18 is disposed in at least one axial end portion of the support roller 2 between the inner cylindrical surface of the support roller 2 and the cushioning layer 19. The sleeve-shaped body 18 preferably projects beyond the support roller 2 on one side in the axial direction, e.g., in the form of a radially-outward extending collar 20. This collar 20 can be formed as a cantilever arm or axial projection and preferably forms a defined axial stop for the support roller 2. Thus, the support roller 2 can be affixed in the axial direction relative to the sleeve-shaped body 18 in a simple manner.

The support roller 2 and the sleeve-shaped body 18 may be fixedly or rigidly connected with each other, e.g., by welding.

Figure 2:
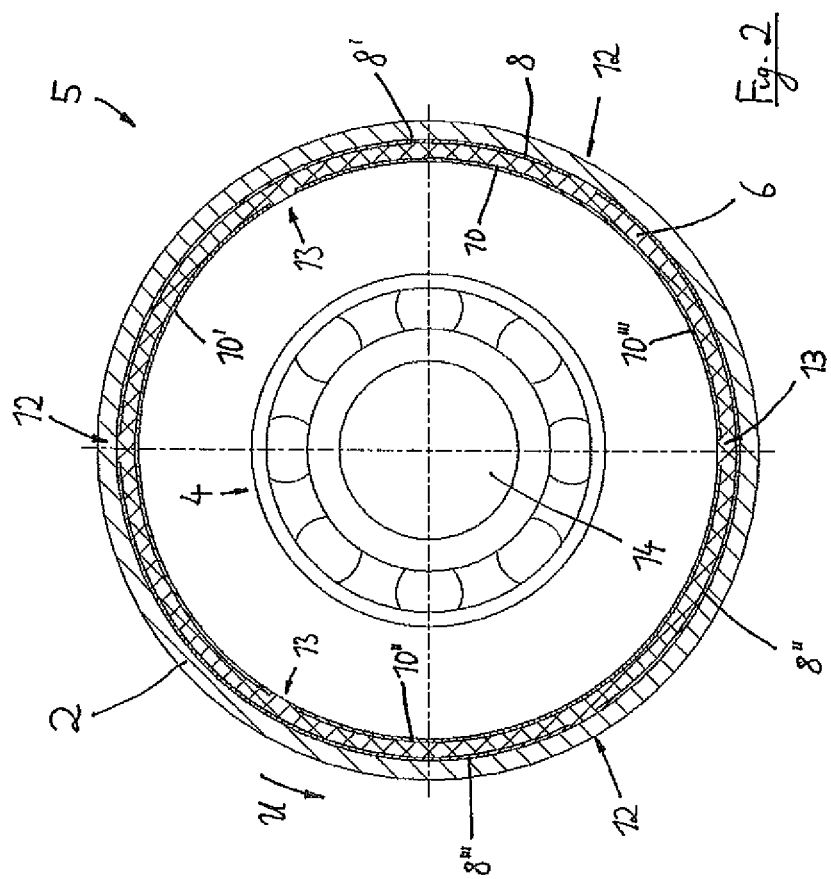
FIG. 2 shows a cross-section of the representative support roller assembly along line A-A indicated in FIG. 1.

At least one cushioning element 5 is preferably disposed within the support roller 2 in the axial spacing between the two bearings 3 and 4. The cushioning element 5 preferably includes at least one ring 6 made of a cushioning material. The ring 6 extends around or over at least portions of the inner circumference of the support roller 2. In the present embodiment, the ring 6 is preferably formed as a continuous ring or having an annular shape, as can be seen in FIG. 2. That is, the ring 6 preferably does not have any breaks or interruptions along the circumferential direction of the ring 6, although the present teachings also encompass rings 6 with breaks or interruptions.

The ring 6 preferably comprises or consists essentially of an elastomer and/or rubber material. An outer sleeve 8 is preferably disposed on the radially outer side of the ring 6 and an inner sleeve 10 is preferably disposed on the radially inner side of the ring 6. The outer sleeve 8 is inserted and/or press-fit into the support roller 2, e.g., it preferably abuts on the inner surface 7 in a press-fit.

During assembly, the cushioning element 5 is pushed in the axial direction into the support roller 2, which is formed like a pipe, until it reaches the desired axial position, where it remains in a fixed position due to the press-fit. However, the cushioning element 5 may also be fixed along the axial direction, e.g., using an adhesive or by welding.

In the present embodiment, the outer sleeve 8 has a radially-inward extending ring segment 9 on one side. Likewise, the inner sleeve 10 has a ring segment 11 that extends radially outwardly. The elastomer or rubber material of the ring 6 is thus held in position in the axial direction and/or is limited or bounded by the ring segments 9 and 11.

As can be further seen from FIG. 2, the two sleeves 8 and 10 are comprised of a plurality—in the exemplary embodiment 3—of segments 8', 8" and 8''' and 10', 10", 10''', respectively. That is, the sleeves 8 and 10 are discontinuous in the circumferential direction U, at least in portions thereof.

The segments of the outer ring 8 and the inner ring 10 are positioned so that, as viewed in the circumferential direction U, the respective break points 12 of the outer ring 8 are offset relative to the respective break points 13 of the inner ring 10. Due to this offset arrangement, a stable connection of the segments of the inner and outer sleeve with the ring 6 results, in particular when the entire unit forming the cushioning element 5, which comprises the sleeves 8 and 10 together with the ring 6, is produced by a vulcanization or injection molding process, in which the elastomer or rubber material is connected in situ with the sleeves and/or its segments.

In the illustrated embodiment, the break points 12 of the outer sleeve 8 are disposed, as viewed along the circumferential direction U, substantially or nearly in the middle of the circumferential extension of the respective segments 10', 10", 10''' of the inner sleeve 10.

In the illustrated embodiment, a single cushioning element 5 is disposed between the roller bearing 3, 4. In practice, a plurality of cushioning elements 5 could be utilized in the interior of the support roller 2. The cushioning elements 5 could then be disposed in manner distributed equidistantly or irregularly in the axial direction.

In the exemplary embodiment, the inner sleeve 10 is illustrated as a rather thin-walled part. However, in some embodiments, more mass may be required to achieve the desired cushioning. The wall thickness of the inner sleeve 10 would then be correspondingly larger.

REFERENCE NUMBER LIST

1 Support roller assembly
2 Support roller

3 Bearing (e.g., roller bearing)
4 Bearing (e.g., roller bearing)
5 Cushioning element
6 Ring
7 Inner circumferential surface of the support roller
8 Outer sleeve
8' Segment of the outer sleeve
8" Segment of the outer sleeve
8'" Segment of the outer sleeve
9 Ring segment
10 Inner sleeve
10' Segment of the inner sleeve
10" Segment of the inner sleeve
10'" Segment of the inner sleeve
11 Ring segment
12 Break point
13 Break point
14 Shaft
15 Inner bearing ring
16 Outer bearing ring
17 Support body
18 Sleeve-shaped body
19 Cushioning layer
20 Collar
a axial spacing
U circumferential direction

The invention claimed is:

1. A support roller assembly comprising:
a support roller that has a hollow cylinder shape at least in one section,
at least first and second bearings rotatably supporting the support roller and being spaced in an axial direction of the support roller,
at least one cushioning element disposed within a hollow portion of the support roller in the axial space defined between the first and second bearings, the cushioning element having at least one ring made of a cushioning material and extending adjacent to at least a portion of an inner circumferential surface of the support roller, and
an inner sleeve disposed at or adjacent to a radially-inward surface of the ring, wherein the ring and the inner sleeve have a hollow-cylindrical shape and the ring and the inner sleeve extend substantially along the same axial extension, and
an outer sleeve disposed between the ring and the inner circumferential surface of the support roller.

2. A support roller assembly according to claim 1, wherein the ring comprises at least one of an elastomer and a rubber material.

3. A support roller assembly according to claim 1, wherein the ring extends completely around the inner circumferential surface of the support roller without breaks.

4. A support roller assembly according to claim 1, wherein the outer sleeve comprises a plurality of segments that are discontinuous in the circumferential direction.

5. A support roller assembly according to claim 1, wherein the outer sleeve includes a radially-inward extending ring segment disposed at at least one of its axial ends.

6. A support roller assembly according to claim 5, wherein the outer sleeve has the ring segment only at one of its axial ends.

7. A support roller assembly according to claim 1, wherein the inner sleeve comprises a plurality of segments that are discontinuous in the circumferential direction.

8. A support roller assembly according to claim 7, wherein the inner sleeve includes a radially-outward extending ring segment disposed at at least one of its axial ends.

9. A support roller assembly according to claim 8, wherein the inner sleeve has the ring segment only at one of its axial ends.

10. A support roller assembly according to claim 9, further comprising an outer sleeve disposed between the ring and the inner circumferential surface of the support roller, wherein the outer sleeve comprises a plurality of segments that are discontinuous in the circumferential direction and the outer sleeve includes a radially-inward extending ring segment disposed at at least one of its axial ends.

11. A support roller assembly according to claim 10, wherein the radially-inward extending ring segment and the radially-outward extending ring segment are disposed on opposite axial ends of the ring.

12. A support roller assembly according to claim 10, wherein break points between the segments of the outer sleeve are offset in the circumferential direction relative to break points between the segments of the inner sleeve.

13. A support roller assembly according to claim 12, wherein the respective break points of the outer sleeve are disposed in the middle of the respective segments of the inner sleeve in the circumferential direction.

14. A support roller assembly according to claim 13, wherein the material of the ring is bonded to at least one of the outer sleeve and the inner sleeve by vulcanization or injection molding.

15. A support roller assembly according to claim 1, wherein the cushioning element further comprises:
an outer sleeve disposed between the ring and the inner circumferential surface of the support roller, wherein the outer sleeve comprises a plurality of segments that are discontinuous in the circumferential direction and the outer sleeve includes a radially-inward extending ring segment disposed at one axial end thereof, and wherein
the inner sleeve comprises a plurality of segments that are discontinuous in the circumferential direction and the inner sleeve includes a radially-outward extending ring segment disposed at one axial end thereof,
wherein the radially-inward extending ring segment and the radially-outward extending ring segment are disposed on opposite axial ends of the ring and enclose the ring in the axial direction of the support roller,
wherein break points between the segments of the outer sleeve are offset in the circumferential direction relative to break points between the segments of the inner sleeve, and
wherein the ring comprises at least one of an elastomer and a rubber material and the ring extends completely and continuously around the inner circumference surface of the support roller.

16. An apparatus comprising:
a substantially hollow roller,
at least first and second bearings disposed within the substantially hollow roller and rotatably supporting the support roller,
a stationary shaft supporting the first and second bearings,
at least one annular-shaped cushion disposed within the substantially hollow roller in an axial space defined between the first and second bearings, the at least one annular-shaped cushion being made of at least one of an elastomer and rubber material and extending continuously around a circumferential direction of the annular-shaped cushion adjacent to an inner surface of the substantially hollow roller, and
an inner sleeve disposed at or adjacent to a radially-inward surface of the cushion, wherein the cushion and the inner sleeve have a hollow-cylindrical shape and the ring and the inner sleeve extend substantially along the same axial extension, and an outer sleeve disposed between the annular-shaped cushion and the inner surface of the substantially hollow roller.

17. An apparatus according to claim 16, wherein the cushion is sandwiched by:

an outer sleeve disposed between the cushion and the inner surface of the substantially hollow roller, wherein the outer sleeve comprises a plurality of segments that are discontinuous in the circumferential direction and the outer sleeve includes a radially-inward extending projection, and wherein the inner sleeve comprises a plurality of segments that are discontinuous in the circumferential direction and the inner sleeve includes a radially-outward extending projection, wherein the radially-inward extending projection and the radially-outward extending projection are disposed on opposite axial ends of the cushion and fix the cushion in the axial direction of the support roller, wherein break points between the segments of the outer sleeve are offset in the circumferential direction relative to break points between the segments of the inner sleeve and wherein the cushion is made of nitrile butadiene rubber and the outer and inner sleeves are made of metal, the rubber and metal being bonded together.

18. An apparatus according to claim 17, further comprising:

a first cushioning layer made of at least one of an elastomer and a rubber material and being disposed between an outer ring of the first bearing and the inner surface of the substantially hollow roller, and a second cushioning layer made of at least one of an elastomer and a rubber material and being disposed between an outer ring of the second bearing and the inner surface of the substantially hollow roller.

19. An apparatus according to claim 16, wherein a hollow space extends between the inner sleeve and the stationary shaft and the inner sleeve has the same axial length as the cushioning member.

20. An apparatus according to claim 1, further comprising:

a stationary shaft supporting the first and second bearings, wherein a hollow space extends between the inner sleeve and the stationary shaft and the inner sleeve has the same axial length as the cushioning member.

* * * * *